March 17, 1931.   A. Y. DODGE   1,796,835
MANUFACTURE OF BRAKE DRUMS

Filed Dec. 3, 1928

INVENTOR.
ADIEL Y. DODGE
BY
ATTORNEYS.

Patented Mar. 17, 1931

1,796,835

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

MANUFACTURE OF BRAKE DRUMS

Application filed December 3, 1928. Serial No. 323,228.

This invention relates to the manufacture of brake drums, and is illustrated as carried out in reinforcing the cylindrical braking flange of an automobile brake drum. Preferably this flange is encircled by a reinforcing strip of metal, which may have its center spot-welded or otherwise secured to the flange and then be progressively secured to the flange in opposite directions from said center, until its ends are brought together, the ends then being arc-welded or otherwise secured together. The ring so formed has an important secondary function in aiding in the dissipation of heat.

The above and other features of the invention will be apparent from the following description of the illustrative embodiments shown in the accompanying drawing, in which.

In the illustrated forms, the drum 10, of conventional form, has the usual cylindrical braking flange 12, which flange may if desired be strengthened at its free edge by a radial flange or rib 14.

Figure 1:
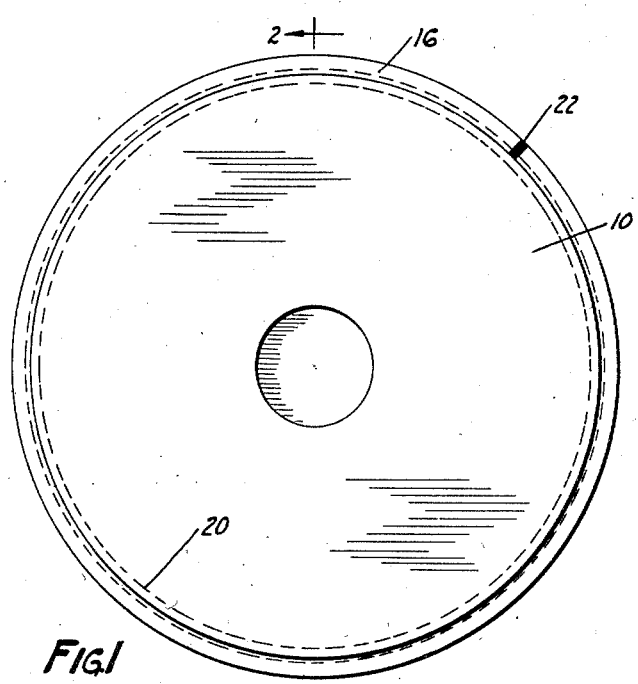
Figure 1 is a side elevation of a reinforced drum.
Figure 2:
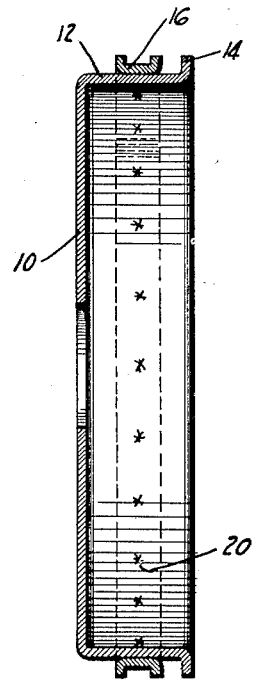
Figure 2 is a section through the drum, on the line 2—2 of Figure 1.
Figure 4:
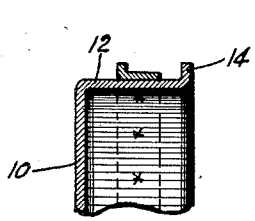
Figure 4 is a partial radial section through a drum having a reinforcing strip of modified form.
Figure 3:
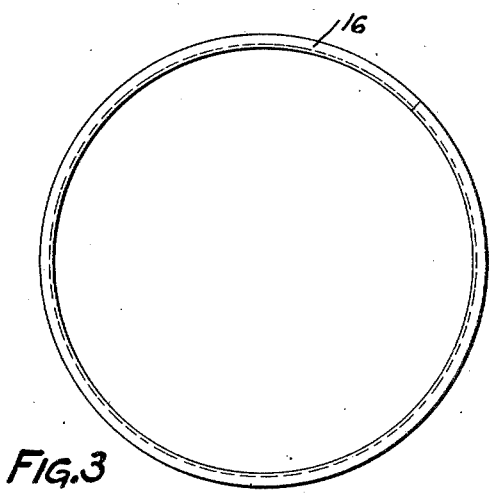
Figure 3 is an elevation of the reinforcing strip or ring.

According to my invention, the flange 12 is reinforced, against distortion outward when the brake is applied, by means such as a channel-shaped strip 16 (Figures 1–3), or an L-section strip 18 (Figure 4), of metal. The strip 16 or 18 is preferably first spot-welded at its center to the flange 12, at 20, and is then progressively spot-welded or otherwise secured to the flange both ways from this center, until its ends are brought together. The ends are then permanently secured together, preferably by an arc-weld 22.

The ring so formed not only reinforces the drum, but also serves to help in dissipating heat.

While two illustrative reinforcements have been described in detail, it is not my intention to limit the scope of the invention by such description, or otherwise than by the terms of the appended claims.

I claim:

1. That method of reinforcing the cylindrical flange of a brake drum which comprises welding the center of a reinforcing strip to said flange, then progressively welding the strip to the flange in opposite directions from said center until the ends of the strip are brought together, and then securing said ends together.

2. That method of reinforcing the cylindrical flange of a brake drum which comprises welding the center of a reinforcing strip to said flange, then progressively welding the strip to the flange in opposite directions from said center until the ends of the strip are brought together, and then welding said ends together.

In testimony whereof, I have hereunto signed my name.

ADIEL Y. DODGE.